July 27, 1926.
A. C. MABY
1,593,661
POSITIONING AND ROTATING MEANS FOR ELECTRODES
Filed April 1, 1918  3 Sheets-Sheet 1
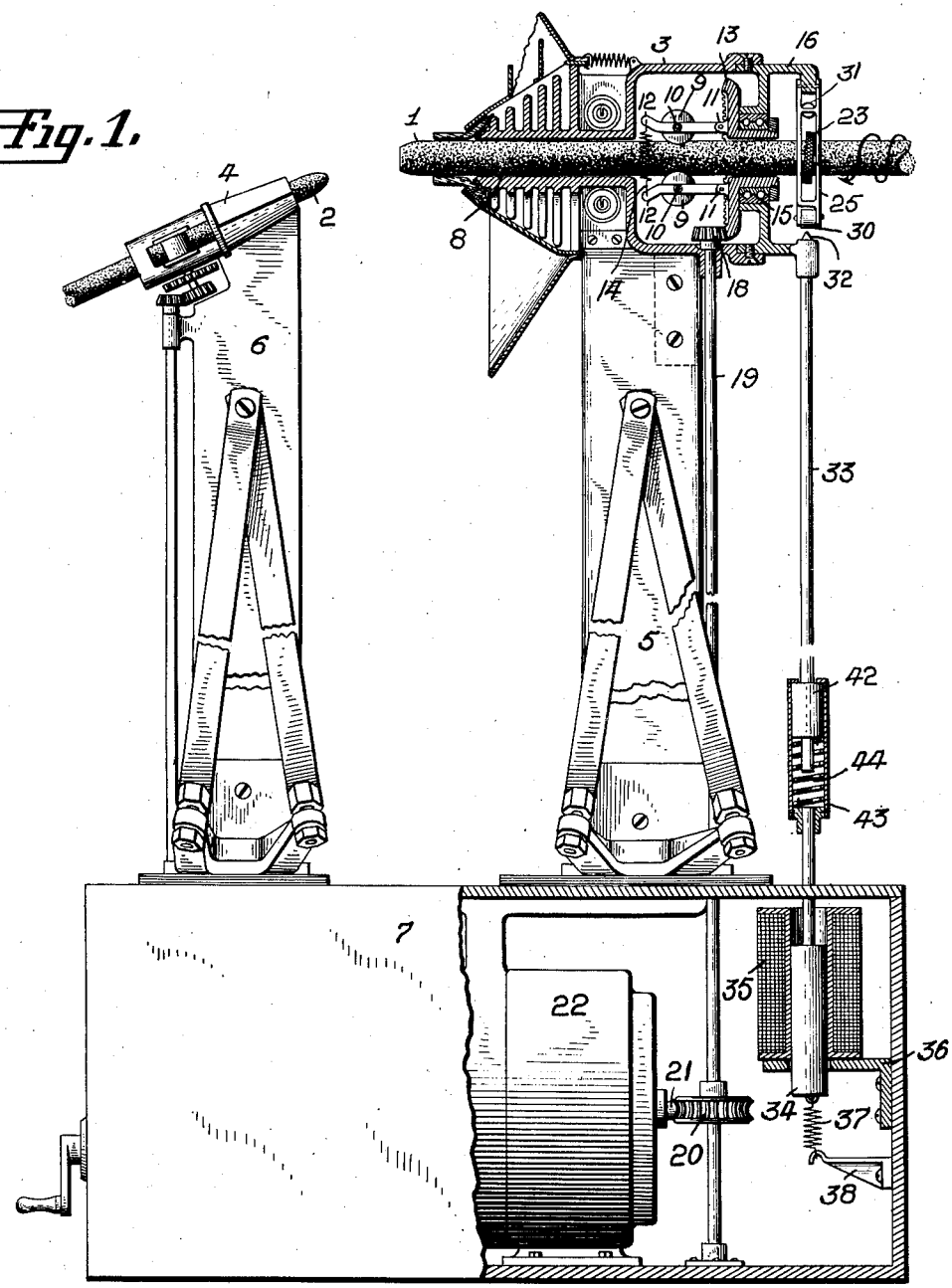
INVENTOR
ADELBERT C. MABY.
BY
Herbert H. Thompson
ATTORNEY July 27, 1926.
A. C. MABY
1,593,661
POSITIONING AND ROTATING MEANS FOR ELECTRODES
Filed April 1, 1918   3 Sheets-Sheet 2
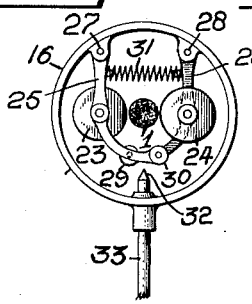
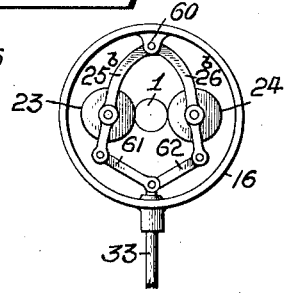
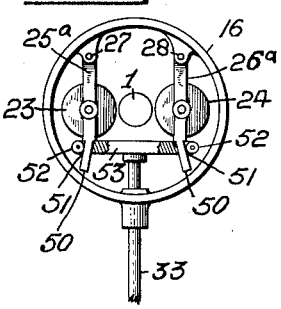
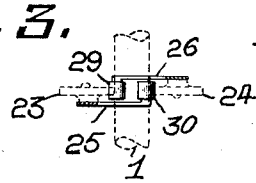
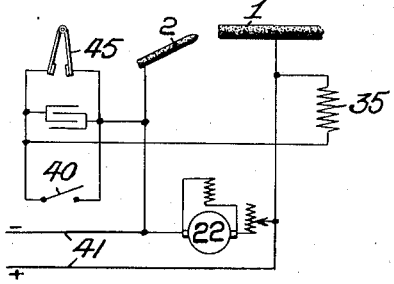
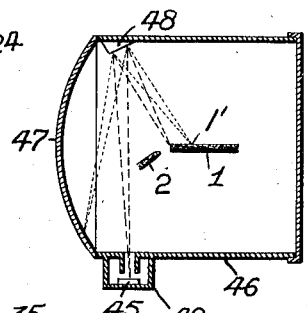
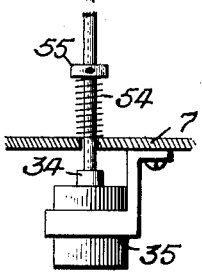
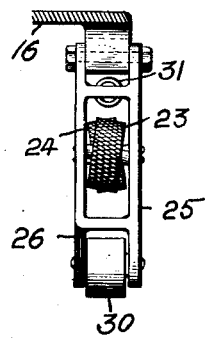
INVENTOR
ADELBERT C. MABY.
BY
Herbert H. Thompson
ATTORNEY July 27, 1926.
A. C. MABY
POSITIONING AND ROTATING MEANS FOR ELECTRODES
Filed April 1, 1918   3 Sheets—Sheet 3
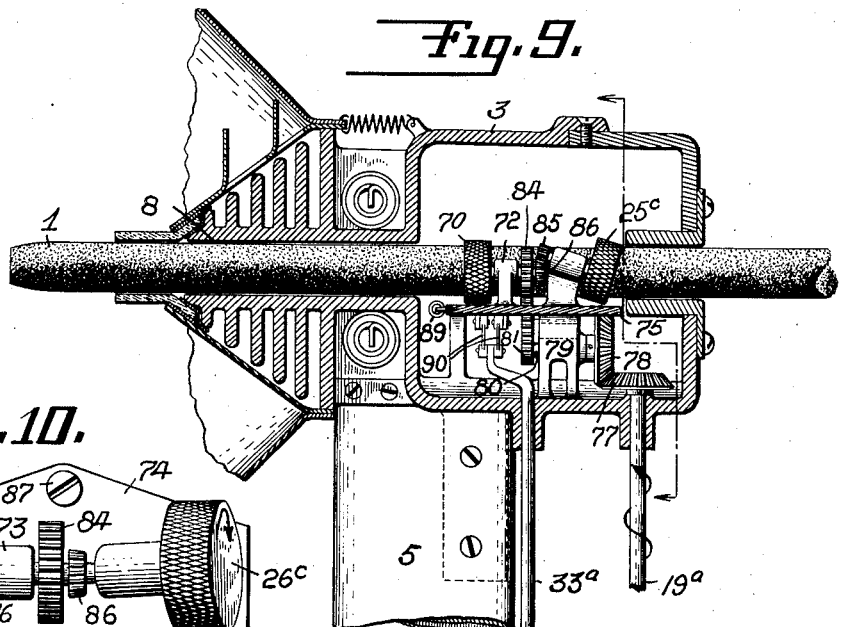
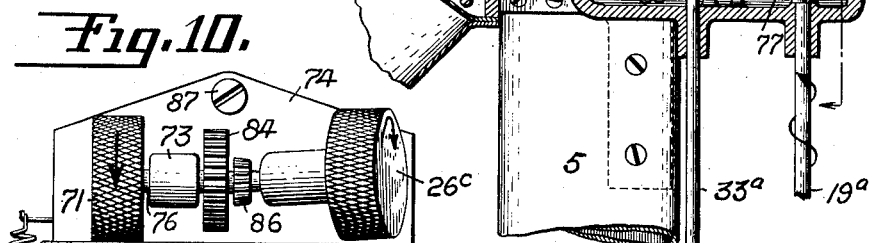
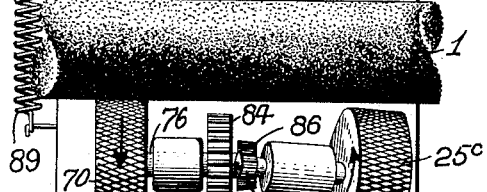
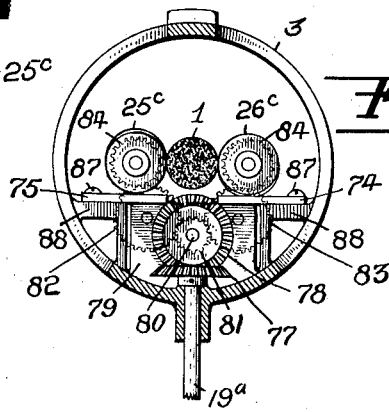
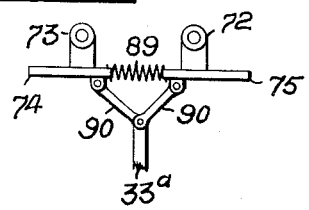
INVENTOR
ADELBERT C. MABY
BY
Herbert H. Thompson
ATTORNEY Patented July 27, 1926.

1,593,661

UNITED STATES PATENT OFFICE.

ADELBERT C. MABY, OF RICHMOND HILL, NEW YORK, ASSIGNOR TO THE SPERRY GYROSCOPE COMPANY, OF BROOKLYN, NEW YORK, A CORPORATION OF NEW YORK.

POSITIONING AND ROTATING MEANS FOR ELECTRODES.

Application filed April 1, 1918. Serial No. 225,947.

This invention relates to arc lamps especially adapted for use in projectors. More specifically the invention relates to the electrode feed mechanism for such projectors.

In electric arc searchlights, it is well known to those skilled in the art that the greater portion of the light emanates from the crater or the immediate vicinity thereof. It is therefore of importance to maintain this crater at a substantially fixed point with reference to the mirror, lens or other condensing means employed. Furthermore, the necessity of avoiding lipping of the active tip of the positive electrode renders it important that the electrode be rotated.

One of the principal objects of the present invention is to provide simple, but positively acting means for accomplishing the above recited functions. Other objects and advantages will appear as the invention is hereinafter developed.

Referring to the drawings which illustrate what I now consider the preferred forms of my invention:—

Fig. 1 is an elevation of one form of my invention applied to the lamp mechanism of a projector.

Fig. 2 is a fragmentary detail elevation of feed mechanism shown in Fig. 1.

Fig. 3 is a fragmentary plan view of the mechanism shown in Fig. 2.

Fig. 4 is a fragmentary detail elevation of the feed mechanism shown in Fig. 1 with the electrode or carbon removed.

Figs. 5 and 6 are views similar to Fig. 2 but illustrating slight modifications.

Fig. 7 is a somewhat diagrammatic view of a searchlight employed in describing the operation of my invention.

Fig. 8 is one form of wiring diagram.

Fig. 9 is a fragmentary detail elevation of a positive head with a modified form of feed and rotating mechanism.

Fig. 10 is an enlarged fragmentary detail plan of the feed and rotating mechanism shown in Fig. 9.

Fig. 11 is a section taken on the line 11—11 of Fig. 9.

Fig. 12 is a fragmentary detail elevation of a part of the mechanism shown in Fig. 10.

While my invention is applicable to other forms of lamps I have illustrated it only in connection with a searchlight comprising a positive electrode 1 and a negative electrode 2. These electrodes, which are shown as carbons, are adapted to be connected to a suitable source of E. M. F. and struck to form an arc. Any suitable mechanism may be employed to feed the negative electrode 2 and for striking the arc and the specific details of this mechanism form no part of the present invention. The electrodes 1, 2 are shown mounted in heads 3, 4 of holders 5, 6 respectively, which holders are shown secured to a casing or base 7. The head 3 is shown provided with a bore 8 in which the carbon or electrode 1 is slidably and rotatably mounted.

The form of my invention preferred at present is shown in Fig. 1 as comprising suitable means for rotating the positive electrode and a novel form of means movable into and out of engagement with the electrode for imparting a screw motion to the same. The first mentioned means is shown as comprising a pair of rollers 9, 9 mounted on a pair of arms 12, 12 for rotation with respect thereto about axes 10, 10. The arms 12, 12 may be pivoted at one end 11, 11 to a rotatable member 13 and connected at their free ends by a tension spring 14. Obviously on rotation of the member 13 the carbon 1 will be rotated and the rollers 9, 9 will permit longitudinal movement of the carbon with respect to the member 13. The latter is preferably rotatably but non-slidably journaled, by means of an anti-friction or other bearing 15, in a cap 16 detachably secured to the head 3. The member 13 may be provided with teeth meshing with a pinion 18 secured to a shaft 19 journaled in the head 3 and top and bottom of housing 7. Said shaft 19 may be driven, preferably continuously, by an electric or other motor 22 through a worm drive 20, 21.

For feeding the electrode 1, I prefer to employ a normally stationary feed roller or rollers 23, 24 (see Figs. 1 to 4) adapted to be moved into contact with said electrode and to be oppositely pitched or inclined when in such contact. The rollers 23, 24 are shown mounted on corresponding levers 25, 26 for rotation about oppositely inclined axes. In Fig. 2 the levers 25, 26 are shown pivoted at 27, 28 to the member 16, the free ends of said levers overlapping, as indicated in Fig. 3, and preferably carrying rollers 29, 30. A compression spring 31 may be provided between the levers for moving the rollers 23, 24 away from each other and out of contact with the carbon 1. Obviously, if the carbon 1 is rotating in the direction indicated by the arrow in Fig. 1 and the rollers 23, 24 are brought into contact with the carbon the latter will be given a screw feed to the left i. e. toward the arc. For moving the rollers 23, 24 toward each other and into contact with the carbon a rod 33 may be employed, said rod being slidably mounted in the member 16 and casing 7 and being provided with a wedge or cone-shaped end 32 adapted to enter between the rollers 29, 30. The rod 33 may be provided at its lower end with a core or plunger 34 adapted to be attracted or pulled upward on energization of a solenoid 35 suitably secured to the casing 7 as by means of a bracket 36. Preferably a spring or other resilient means 37 should be provided for withdrawing or aiding in withdrawing the end 32 when the solenoid 35 is deenergized. The spring 37 is shown secured at one end to the core 34 and at the other to a hook 38 secured to the casing 7. The energization of solenoid 35 and consequently the feeding of the positive electrode may be controlled manually by means of a switch 40 (see Fig. 8) in series with the solenoid 35 across the mains 41. With the switch 40 open and the motor 22 energized the carbon 1 will be rotated but no feed will take place. If it is desired to feed the carbon 1 toward the arc the switch 40 should be closed to energize solenoid 35 to throw the rollers 23 and 24 into contact with said carbon. Said rollers, which are knurled or roughened at their peripheries will cause the rotational motion of the carbon to be converted into a screw motion toward the arc. The feed may be stopped by opening the switch 40 to permit the rod 33 to be retracted and the rollers 23, 24 to be moved away from the carbon 1.

If desirable a shock absorbing yielding connection may be provided in the rod 33 for the purpose of relieving the pivoted parts of excessive strains and shocks. One form of such connection is shown in Fig. 1 as comprising a sleeve 43 secured to the lower portion of rod 33 and loosely surrounding a plunger 42 secured to the other portion of said rod. A compression spring 44 is provided in said sleeve between the lower end thereof and the plunger 42.

If the feed of the negative electrode or carbon 2 is so controlled that the tip thereof is maintained at a substantially fixed position with respect to its head 4, the solenoid 35 may be so designed as to maintain the length of the arc substantially constant and consequently the position of the positive tip or crater substantially fixed with respect to its head 3. In this case the switch 40 may be closed permanently and when the arc becomes too long, due to consumption of the positive carbon 1 or any other cause, the solenoid 35 will receive sufficient current to raise the rod 33 to cause said positive electrode to be fed toward the arc. As soon as the arc reaches the proper length the current through the said solenoid will be insufficient to hold the feed mechanism in operative position and the feed will stop.

I prefer, however, to automatically control the positive feed in such a manner as to maintain the crater of the positive electrode in a substantially fixed position with respect to the condenser employed, preferably at the focus of the latter, regardless of the position of the negative carbon 2. This may be accomplished by providing a thermostatic circuit controller 45 in parallel with the switch 40 and mounted on the searchlight drum 46 in such a position as to receive rays from the positive crater only when the latter is substantially at the focal point of the mirror or other condensing means 47. In Fig. 7 I have shown the crater of the carbon 1 at the focal point of the mirror 47, in which position rays emanating from said crater and reflected by an auxiliary mirror 48, provided at one side of the drum 46, impinge upon the thermostat 45. Direct rays from the crater are preferably excluded from said thermostat by means of a shield 49. If, due to consumption or any other cause, the crater assumes a position away from the focal point, as at 1' for example the reflected rays will not impinge upon the thermostat 45, so that the latter will cool and close the circuit. The operation of the above described system is substantially as follows.

When the mains 41 are deenergized the thermostat is closed. The lamp may be started by energizing said mains, leaving switch 40 open. The arc is struck by the negative electrode mechanism, not shown, and the motor 22 is energized as is also the solenoid 35. The carbon 1 will feed toward the arc until the crater thereof is at the focal point when the thermostat will open to deenergize the solenoid 35 to stop the feed of the positive carbon. As the latter burns away the reflected rays will leave the thermostat and the latter will close to cause the positive to be fed toward the arc until the positive crater is again at the focal point.

The mechanism above described is susceptible to various modifications. Thus, the levers 25, 26 may assume the form indicated at 25ª and 26ª in Fig. 5 in which case the spring 31 may be dispensed with. In this form of the invention the levers 25ª and 26ª are provided with oppositely bent ends 50 each extending through a corresponding opening 51 in a cross-piece or head 53 secured to the upper end of rod 33. Rollers 52 may be provided on the head 53 adjacent the openings 51 and in a position to engage the ends 50 in order to minimize friction and prevent binding. In this form the rod 33 is preferably biased toward its upper position by a compression spring 54 surrounding said rod between the casing 7 and a collar 55 fixed on said rod. Furthermore the core 34 is so arranged that on energization of its solenoid 35 the rod 33 will be pulled downwardly to move the rollers 23 and 24 into feeding position.

The invention may be modified also by substituting the mechanism shown in Fig. 6 for that shown in the upper part of Fig. 5. In this form the levers 25$^b$ and 26$^b$ are shown connected to the member 16 by a common pivot 60 and are pivotally connected at the free ends to links 61, 62 in turn pivoted to the rod 33. Obviously when the latter is in its upper position the rollers 23 and 24 will be out of contact with carbon 1 and when the rod is in its lower position said rollers will engage the carbon to feed the latter.

As previously stated various forms of rotating means for the electrode 1 may be employed. Thus instead of employing the mechanism shown in Fig. 1 a pair of rotated rollers 70, 71 may be employed, as indicated in Figs. 9 and 10. These rollers are shown provided with knurled or roughened peripheries so that when they are in engagement with the carbon 1 and are rotated, said carbon will be rotated. The mechanism for rotating the last mentioned rollers will be described hereinafter. As the axes of said rollers 70, 71 are parallel to the axis of the carbon 1 it will be seen that considerable resistance or opposition will be offered to any axial movement of the latter. It is therefore preferable to disengage the rollers 70, 71 from the carbon when the feed is to take place and to design the feed mechanism so that the latter will impart both a rotation and feed to the electrode when in the operative position. One form of structure for accomplishing these functions is illustrated in Figs. 9 to 12 and may be constructed substantially as follows:

The rollers 70, 71 are secured to shafts 76 rotatable in journals 72, 73 carried respectively by plates 75, 74. A pair of feed rollers 25$^c$, 26$^c$, are similarly mounted on plates 75, 74 except that the axes of the last mentioned rollers are oppositely inclined with respect to the axis of the electrode 1. The rollers 70, 71, 25$^c$ and 26$^c$ are adapted to be continuously rotated by a shaft 19$^a$ through the following train of gearing. The shaft 19$^a$, which may be rotated in the same manner as the shaft 19 in Fig. 1, carries at its upper end a bevel gear 77 which meshes with a bevel gear 78, the shaft 80 of which is journaled in a bracket 79 secured to the head 3. The shaft 80 has fixed thereto a gear 81 which meshes with idlers 82, 83 journaled in the bracket 79. Each of the shafts 76 has fixedly secured thereto a gear 84 which meshes with a corresponding one of idlers 82, 83. By virtue of the above described mechanism the rollers 70, 71 will be rotated by rotation of the shaft 19$^a$. The shafts of the feed rollers 25$^c$ and 26$^c$ are shown provided with gears 85 each of which meshes with a corresponding one of gears 86 secured to shafts 76, so that the feed rollers will rotate along with rollers 70, 71.

In order to control the feeding of the electrode I provide means for disengaging either set of rollers from the electrode and for simultaneously moving the other set into operative or electrode-engaging position. The base plates 74, 75 of the rollers are each shown pivoted at 87 to a corresponding one of lugs 88 carried by the head 3. I prefer to bias the rollers 70, 71 to electrode-engaging position, as shown in Fig. 10, in which position the feed rollers 25$^c$, 26$^c$ are disengaged from the electrode. This bias may be accomplished by means of a tension spring 89 connecting the ends of plates 74, 75 adjacent rollers 70, 71. A rod 33$^a$, actuated in the same manner as the rod 33 in Fig. 1, may be employed for moving the rollers 70, 71 to disengaging and the feed rollers 25$^c$, 26$^c$ to electrode engaging position. The plates 74, 75 have pivotally connected thereto toggle-links 90, the opposite ends of which are pivotally connected to the upper end of the rod 33$^a$ as shown in Figs. 9 and 12.

Assuming that the shaft 19$^a$ is rotating in the direction indicated by the arrow in Fig. 9 the rollers 70, 71, 25$^c$ and 26$^c$ will be rotated in the direction of the arrows in Fig. 10. If the solenoid 35 is deenergized the parts will occupy the position indicated in Fig. 10 in which the rollers 70, 71 impart a rotational movement to the carbon 1. If the rod 33$^a$ is moved upwardly by energization of solenoid 35, or in any other manner, the plates 74, 75 will be shifted against the action of the spring 89 to move the rollers 70, 71 out of contact with the carbon. The rollers 25$^c$, 26$^c$ simultaneously move into engagement with the electrode to impart a combined rotational and feed motion, i. e. a screw motion, to the latter until the rod 33$^a$ again moves downwardly. It will be noted that the motion of plates 74, 75 is comparatively small so that the operativeness of the gearing is not disturbed on such motion.

In accordance with the provision of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted and some of the features of each modification may be embodied in the others without interfering with the more general results outlined, and the invention extends to such use.

Having described my invention, what I claim and desire to secure by Letters Patent is:—

1. In a searchlight, a holder for an electrode, means for rotating said electrode, means comprising a feed roller so positioned as to feed the electrode through the holder when the roller is in engagement with the electrode, and arc controlled means for causing said roller to engage the electrode when feeding is needed.

2. In a searchlight, a holder for an electrode, means comprising a feed roller so positioned as to feed the electrode through the holder when the roller is in engagement with the electrode and when said roller is rotating and means responsive to the position of the electrode tip for moving said roller into and out of engagement with the electrode.

3. A feeding means for an electrode including means for rotating said electrode, means movable into engagement with said electrode for converting the rotational motion thereof into a screw motion and means controlled by the position of the tip of said electrode for moving said converting means into engagement with said electrode.

4. In a searchlight, a holder for an electrode, means comprising a feed roller for feeding the electrode through the holder when the roller is in engagement with the electrode and when said roller is rotated, means for rotating said electrode, and arc controlled means for causing said roller to disengage the electrode when further feeding is not needed.

5. In a searchlight, a feeding mechanism for projectors and the like, an electrode holder, means for rotating the electrode, a lamp box on which the same is supported, a roller movably and rotatably mounted on said holder and having its axis of rotation at an angle to the electrode axis, and means including a rod extending from the holder and actuated from said lamp box for moving said roller toward or away from the electrode to govern the feed.

6. In a searchlight, a feeding mechanism for projectors and the like, an electrode holder, means for rotating the electrode, a lamp box on which the same is supported, a member movable both toward and away from the electrode and across the periphery thereof at an angle to the axis thereof, and means for adjusting the position of said member to cause it to feed the electrode including a rod extending from the holder and actuated from said lamp box.

7. In an arc lamp, a holder for an electrode, means for rotating an electrode in the holder, means adapted to be actuated by the electrode to feed the same and means controlled by the position of the arc for controlling said feeding means.

In testimony whereof I have affixed my signature.

ADELBERT C. MABY.